United States Patent [19]

Qader

[11] Patent Number: 4,582,590

[45] Date of Patent: Apr. 15, 1986

[54] SOLAR HEATED OIL SHALE PYROLYSIS PROCESS

[75] Inventor: Shaik A. Qader, Claremont, Calif.

[73] Assignee: The Unied States of America as represented by the Administrator, National Aeronautics and Space Administration, Washington, D.C.

[21] Appl. No.: 633,363

[22] Filed: Jul. 23, 1984

[51] Int. Cl.⁴ .................................. C10B 53/06
[52] U.S. Cl. ......................... 208/11 R; 48/197 R; 48/DIG. 9
[58] Field of Search ............... 48/DIG. 9, 209, 197 R, 48/210, 111; 201/31, 34; 202/120, 108, 99; 126/417, 451; 208/11 R, 8 R; 203/DIG. 1; 196/14.52, 120

[56] References Cited

U.S. PATENT DOCUMENTS

| | | | |
|---|---|---|---|
| 2,760,920 | 8/1956 | Olsen | 202/96 |
| 3,574,087 | 4/1971 | Bergen | 208/11 R |
| 3,868,823 | 3/1975 | Russell, Jr. et al. | 126/270 |
| 3,993,458 | 11/1976 | Antal, Jr. | 48/209 |
| 4,149,856 | 4/1979 | Keller | 48/197 R |
| 4,229,184 | 10/1980 | Gregg | 48/202 |
| 4,290,779 | 9/1981 | Qader et al. | 48/89 |
| 4,415,339 | 11/1983 | Aiman et al. | 48/209 |

OTHER PUBLICATIONS

"Coal Gasification Using Solar Energy", Solar Energy, vol. 30, No. 5, pp. 443–440, 1983, V. K. Mathur.

Primary Examiner—Peter Kratz
Attorney, Agent, or Firm—Paul F. McCaul; Thomas H. Jones; John R. Manning

[57] ABSTRACT

A bed (76, 202) of oil shale particles (10) are pyrolyzed in a retort (70, 200) by means of a heated carrier gas stream passing through a central conduit (54, 202) within the bed (76, 202) and then upwardly through a fixed bed (76) or fluidized bed (202) of the shale. The shale is subjected to pyrolysis and evolves kerogen liquid, thermally and pyrolyzed liquids and gases which enter the carrier gas to form a pyrolysis gas. The liquid pyrolysis oil is separated from the pyrolysis gas ion separator (94, 224) and a portion of the separated gas is recycled to a solar heat exchanger (50, 204) and heated to a temperature of at least 350° C. before being fed to the central conduit (54, 202).

14 Claims, 3 Drawing Figures

SOLAR HEATED OIL SHALE PYROLYSIS PROCESS

ORIGIN OF THE INVENTION

The invention described herein was made in the performance of work under a NASA contract and is subject to the provisions of Section 305 of the National Aeronautics and Space Act of 1958, Public Law 83-568 (72 Stat 435; 42 USC 2457).

TECHNICAL FIELD

The present invention relates to recovery of a liquid hydrocarbon fuel from oil shale by retorting and, more particularly, this invention relates to the use of a solar-heated retort for pyrolysis of kerogen.

The consumption of oil and gas represents about 80% of the consumption of fossil fuels in the United States. At the present time, about one-half of the electric power is generated from natural gas and petroleum. Fuels other than liquid and gaseous hydrocarbons, such as nuclear, hydrogen or methanol are being investigated as are power sources other than internal combustion engines, such as fuel cells, photovoltaic cells or electric storage batteries. However, consumers are accustomed to using liquid fuels and the supply, distribution, power generation and marketing infrastructure are already in place. The demand for liquid hydrocarbon fuels for power generation and transportation is expected to double by the year 2000.

There are large deposits of oil shale in the United States and Canada. The organic portion of oil shale has a higher indigenous hydrogen content than coal. This fossil fuel is a potential source of liquid fuel which would conserve the rapidly depleting petroleum and natural gas resources for other essential uses such as a feedstock for the synthetic rubber and resin industries. The liquid hydrocarbon extract from oil shale could also supply chemical intermediates or serve as a synthetic resin or rubber feedstock.

Green River oil shale in the western United States is considered by many as second only to coal as the largest potential source of fuel in the energy future of the United States. In addition, because of its high indigenous hydrogen content, it is considered superior to coal as a potential feedstock for conversion into liquid fuels. The organic matter in oil shale is conventionally separated by retorting from the inorganics with which it is associated. Temperatures sufficient to crack the organics are used, and a very-high-nitrogen, unstable "petroleum" is produced. It is forecasted by some strategic planners that such oil shale syncrude could enter into the domestic market during the next decade and result in reduction in the nation's dependency on overseas fuel supplies. However, retorting has not yet proven capable of producing a fuel that is truly cost competitive, and present decreases in the price of crude petroleum have reduced at least the short term commercial potential of all synfuels.

BACKGROUND ART

Oil shale retorting in either above-ground or insitu retorts centers around heating the material, which is typically 85% rock, to about 480° C. (900° F.) or higher in a low oxygen environment. The kerogen and bitumen in the rock are decomposed into oil, gas, and a residual char which remains within the rock. Under favorable circumstances in the laboratory, 70 wt% of the organic matter is converted to oil upon heating to 500° C., and the remainder is converted to about 15% gas and 15% char. These yields change when oil shale is processed in prototype commercial retorts. Oil yield is reduced from 10% to 30% below modified Fischer assay yields, depending on the process, and char and gas yields are correspondingly increased.

The energy content of the organic matter not converted to oil exceeds net process heat requirements for oil shale retorting. The excess depends on the organic content of the shale and the process design, but for well developed processes using a medium grade of shale (roughly 11 to 15 wt% organic matter) the excess can be 100% greater than heat requirements. For instance, the TOSCO II process is based on discarding 100% of the char produced from 11% organic matter shale. The excess can be double or triple this amount when richer material is processed.

The energy contained in the char and gas by-products typically cannot be used efficiently. The gas produced is often greatly diluted with nitrogen and carbon dioxide, and the heat content and its efficiency of usage are greatly reduced. In addition, the energy generated by combustion of the residual char in the rock is considerably less than might be anticipated, because of high temperature endothermic mineral carbonate decompositions which occur when the char is burned. In short, the fuels are in dilute forms and the energy contents have low thermodynamic availability. This severely reduces or eliminates their commercial value. Areas in which western oil shale would be developed contain little or no nearby industrial base which could use such fuel, and the gas and char would require prohibitively costly transport. This combined with very low value causes char and gas in excess of process fuel requirements to be waste disposal problems, rather than saleable by-products.

The above characteristics of retorting are drawbacks, since energy in saleable form is the desired product. Requirements for heating rock to high temperature, excessive conversion of organic matter to char and gas, and the low value of the diluted energy content of these by-products combine to reduce the net saleable energy to $\frac{1}{3}$ to $\frac{1}{2}$ below that contained in the raw oil shale.

U.S. Pat. No. 3,574,087 to Bergen is an example of an oil shale retorting system in which particles of oil shale fall downwardly through a column of upwardly flowing recycle gas. Solar energy has been utilized in the recovery of hydrocarbon fuels. U.S. Pat. No. 4,290,779 discloses the gasification of coal or other biomass material by passing solar heated recycle gas upwardly through a bed of biomass. The recycle gas is heated by passing downwardly through an external honeycomb jacket surrounding the reactor.

Olsen (U.S. Pat. No. 2,760,920) uses a parabolic concentrator to focus solar rays onto a furnace in a coking process. Russell, Jr., et al. (U.S. Pat. No. 3,868,823) use a solar concentrator to gasify coal or oil. Antal, Jr. (U.S. Pat. No. 3,993,458) discloses a reactor with a quartz window for solar energy conversion of solid waste into a synthetic fuel. Keller (U.S. Pat. No. 4,149,856) focuses solar energy onto coal immersed in water in a solar reactor. Gregg (U.S. Pat. No. 4,229,184) applies focused solar rays onto a vertical moving bed of coal and uses a heliostat mirror to generate steam. Aiman, et al. (U.S. Pat. No. 4,415,339) is another instance of solar coal gasification.

Though these solar heating elements are effective for use in lower temperature chemical processing, they are not believed to be suited for direct heating of solid particles of oil shale to the threshold temperature for pyrolysis, usually at least 750° F. (400° C.).

STATEMENT OF THE INVENTION

An improved system for recovery of a liquid hydrocarbon fuel from oil shale is provided by the present invention. The system of the invention is energy efficient and does not require parasitic consumption of shale oil to fuel the pyrolysis reactor. The system of the invention makes oil shale recovery much more economically attractive.

The oil shale pyrolysis system of the invention comprises a retort reactor for receiving a bed of oil shale particles which are heated to pyrolysis temperature by means of a recycled solar heated gas stream. The gas stream is separated from the recovered shale oil and a portion of the gas stream is rapidly heated to pyrolysis temperature by passing it through an efficient solar heater, such as a ceramic honeycomb receiver having a window for applying solar rays to the honeycomb heat element. At times of low solar flux such as during overcast conditions, a conventional hydrocarbon fueled burner may be utilized to assist in heating the recycle gas. Steam, oxygen, air or other oxidizing gas can be injected into the recycle gas before or after the recycle gas is heated to pyrolysis temperature to combust part of the recycle gas and thus raise its temperature before it enters the retort reactor. The combustion reaction is much more efficient in the absence of carbonate or other shale rock fragments.

The recycle gas is not diluted with nitrogen and/or carbon dioxide and its heat content and efficiency are high. The process and system of the invention provides substantially increased yield of shale oil by the use of solar thermal heat to preheat the recycle gas and optionally the steam before introducing it into the bed of shale. Though a black body is theoretically an efficient means to heat walls of a retort, the extremely high temperatures achievable by solar concentrators would cause local overheating and weakening of the walls of the retort vessel. The preheating of the recycle gas is conducted in accordance with this invention in a solar heat absorption zone constructed of an open cell high heat capacity refractory material housed in an insulating shell containing a plurality of windows transparent to solar energy such as fused silica. High thermal efficiency is preserved by passing the hot recycle gas countercurrent to the rising retort gas downwardly through the bed of shale. The present invention overcomes problems inherent in the previously utilized solar apparatus by utilizing a solar heat absorption zone to efficiently and effectively provide the heat necessary to carry out retorting of shale, biomass solids and other carbonaceous materials.

The solar gasification apparatus of the present invention operates on the same general principles as the well known prior art retorting systems. A retort defining a reaction zone is provided with means for introducing retorting gas, steam and carbonaceous material into the retorting zone. Means are also provided for removing the gas-liquid product from the reaction zone and for separating recycle gas and solids from the kerogen liquid.

The recycle gas and steam are both preheated by being passed through the recycle solar heater prior to entry into the retorting zone. Sufficient heat is transferred to the recycle gas and steam as they pass through the solar heat absorption zone to pyrolyze and extract the kerogen liquid from the shale. The system of the invention advantageously avoids the problems caused by blackening of the solar input window and also overcomes the problem of zone overheating adjacent the solar input window. The flowing gas uniformly distributes and dissipates heat throughout the heat exchange zone.

These and many other features and attendant advantages of the invention will become apparent as the invention becomes better understood by reference to the following detailed description when considered in conjunction with the accompanying drawings.

DETAILED DESCRIPTION OF THE INVENTION

Figure 1:
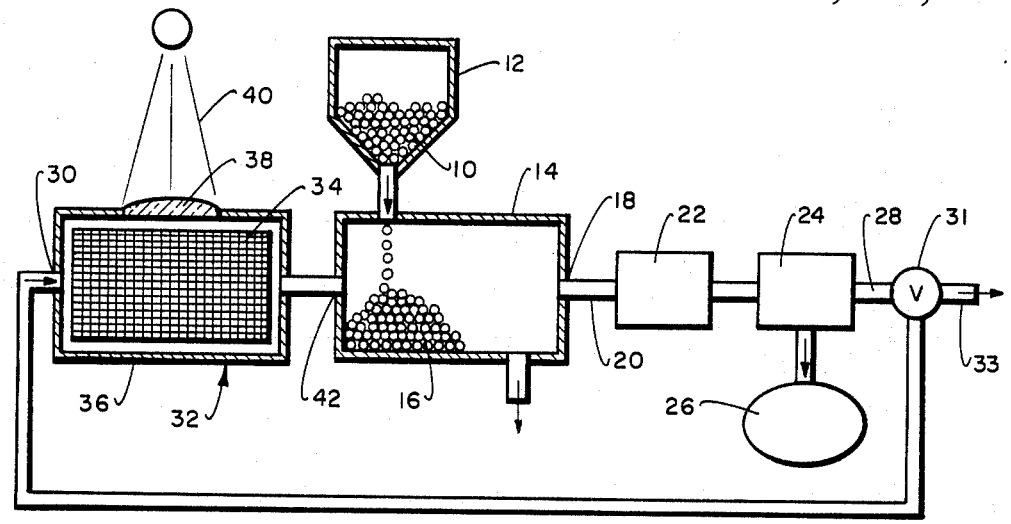
FIG. 1 is a block diagrammatic view of the oil shale retorting system of the invention.

Referring now to FIG. 1, shale particles 10 in storage bin 12 are processed in a retort 14 by flowing a retorting gas heated to a temperature of at least 350° C. through a bed 16 of the shale. The shale is heated by the gas and evolves hydrocarbon gases, inert gases and bitumen and kerogen liquids. The liquid may be cracked into smaller molecules of lower viscosity hydrocarbon liquids or gases. The retort gas carries the liquids and gases produced out of the retort through outlet 18 and line 20 into a first solids separator 22 and a second liquid-gas separator 24. The liquid is recovered and stored in tank 26 while a portion of the product gas in line 28 is recycled to the inlet 30 of a solar heat exchanger 32 by means of a proportioning valve 31. The remainder of the gas is recovered through line 33.

The solar heat exchanger 32 contains a porous element 34 of an opaque, high heat capacity solid such as a ceramic honeycomb disposed within an insulated shell 36. At least one opening containing a window 38 of a transparent material resistant to high temperature such as silica or quartz is provided in the shell 36. As the solar rays 40 enter the window 38 and are absorbed by the ceramic element 34, the recycle gas is heated to retort temperature by the time it enters the inlet 42 of the retort 14. The system of the invention is capable of operating with little or no sacrificial consumption of the recovered shale oil or hydrocarbon gas to operate the retort. Furthermore, use of product gas further conserves energy since it leaves the retort at a temperature near its inlet temperature.

The size of the oil shale particles and the proportion of gas recycle depends on the type of retorting system utilized. From about 10 to 40 percent by volume, usually about 20 to 30 percent by volume of the outlet gas from the retort is recycled to the solar heat exchanger. Fluidized operation requires finer sized particles of the order of about 1 to 1000 microns, suitably about 100 microns for satisfactory fluid bed operation. Fluid bed operation is continuous and the product in retort gas and spent shale can be continuously removed. Fluidized operation also provides efficient heat transfer to the large area, small diameter particles and mass transfer from the particles to the flowing retort gas.

However, there are energy and equipment costs required in grinding oil shale, a fairly hard material, to the very small size required for fluidized bed operation. In certain cases, fixed bed retorting of shale particles of about 0.1 to 3 inches, usually 0.25 to 1 inch in diameter, may be more economically efficient.

Figure 2:
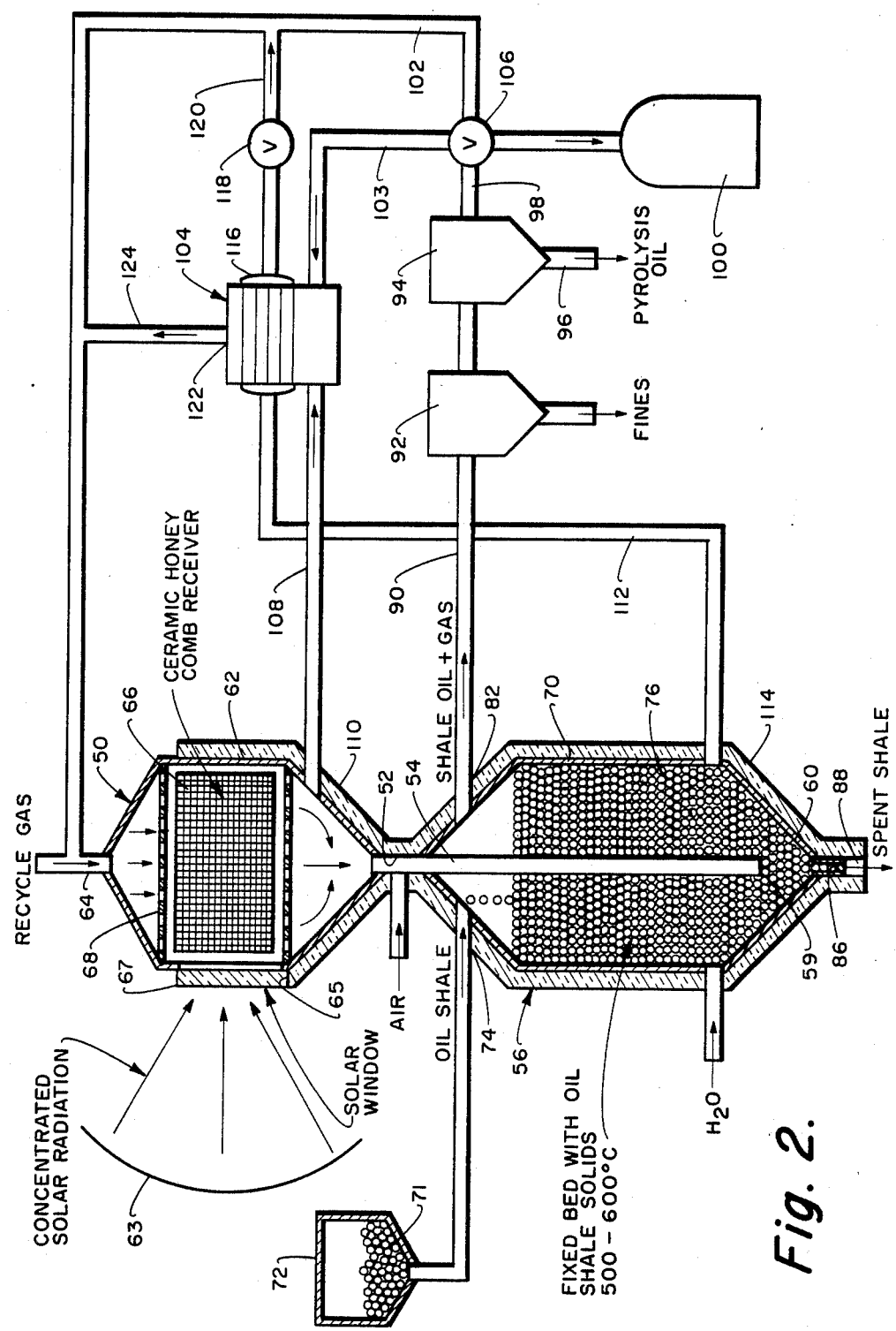
FIG. 2 is a schematic view of a fixed bed solar-assisted system for retorting oil shale.

A fixed bed solar heated oil shale retorting system is illustrated in FIG. 2. The system includes a solar heat exchanger 50 having its outlet 52 connected to a conduit 54 which is centrally located in the retort 56 with its lower outlet end 59 positioned near the bottom end 60 of the retort 56.

The heat exchanger 50 has a shell 62 with an upper inlet 64 and a lower outlet 52. A gas permeable, high heat capacity heating element 66 is disposed within the shell 62. An upper distribution plate 68 is mounted between the inlet 64 and the element 66 to provide more even flow of the recycle gas through the element. Solar radiation can be focused by means of a solar concentrator 63. The focused radiation is radiated onto the element 66 by means of openings 65 in the shell containing windows 67.

The retort is an elongated vessel 70 surrounding the conduit 54. Oil shale 71 particles are fed from bin 72 into the upper inlet 74 and form a bed 76 surrounding the conduit 54. The recycle gas entering inlet 64 is heated by the passage through the solar heated element 66. It flows down the conduit 54 out the bottom outlet 59 and rises upwardly through the bed 76. The particles 71 will be pyrolyzed by the hot recycle gas which causes hydrocarbon gases and liquids to be evolved which are carried by the recycle gas out the outlet 82. The spent shale and char particles leave the vessel 70 through an outlet 86 containing a pressure lock 88.

The outlet 82 is connected to line 90 containing a solids separator 92 for removing fines and a liquid-gas separator 94 for recovering liquid oil product at 96 and a gas product at 98. The gas product is distributed to storage 100, recycle line 102 and line 103 by means of a proportioning valve-assembly 106. The burner 104 is connected to line 103 and also receives a flow of air from line 108. The air is preheated in jacket 110 surrounding the heat exchanger 50. Water in line 112 is preheated in jacket 114 surrounding the vessel 70 before being fed to the tube bank 116. The air in line 108 and recycle gas in line 103 combust to form combustion gas which heats the water in tube bank 116 to steam. The steam is controllably injected by valve 118 in line 120 into the recycle line 102. The exhaust 122 from the burner can also be fed into recycle line 102 by line 124 to raise the temperature of the recycle gas as needed during times of low solar flux.

The system can be operated using oil shale particles having a diameter from about 0.25 inch to 1.0 inch retorted with 25 percent recycle gas heated to a temperature from 500° C. to 600° C. in a ceramic honeycomb solar heat exchanger.

Figure 3:
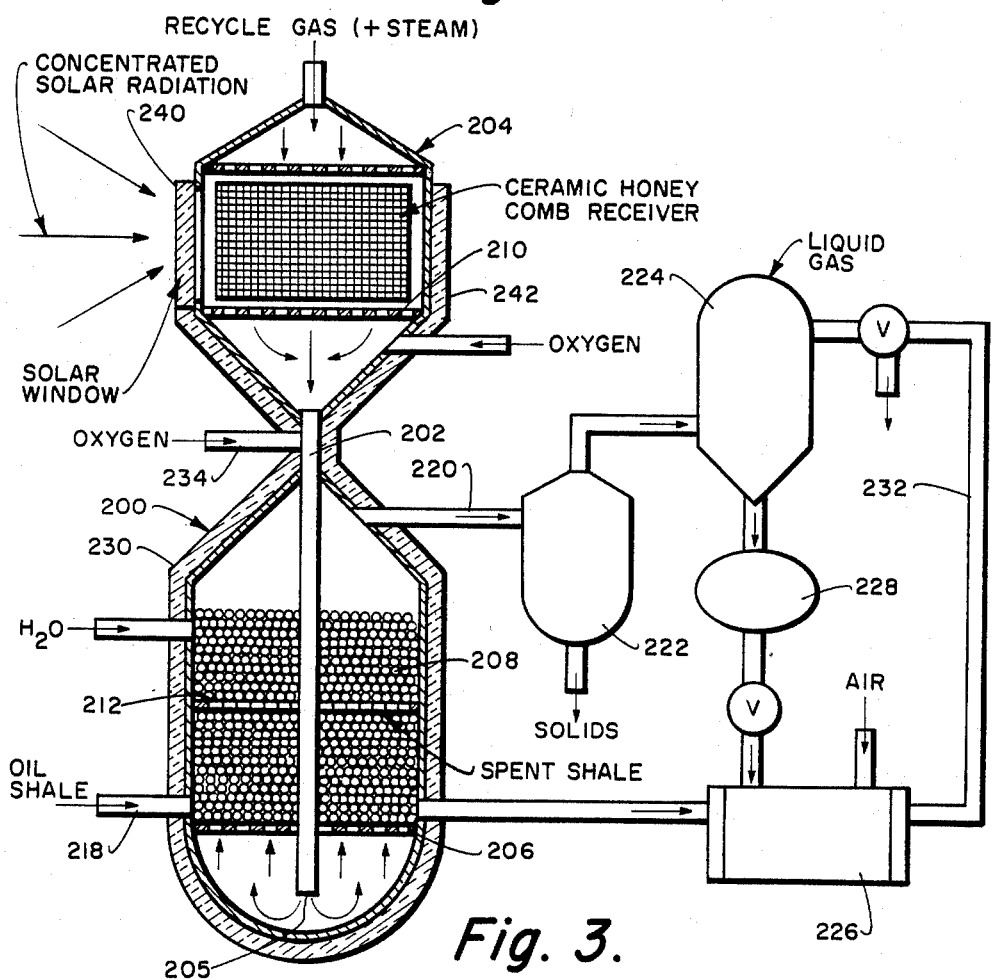
FIG. 3 is a schematic view of a fluidized bed system for the solar-assisted recovery of a liquid product from shale.

A fluidized bed solar heated oil shale retort system is illustrated in FIG. 3. The retort 200 again is connected to the solar heat exchanger 204 by a central pipe 202 having its outlet 205 disposed below the distributor screen 206 supporting the fluidized bed 208. An upper screen 210 can be utilized to contain fines. A collector plate 212 to remove spent shale can be mounted above the distributor screen 206.

The shale inlet 218 is positioned in this case near the bottom of the retort 200 above the screen 206. The outlet 220 of the retort 200 is connected to a solids separator 222 and a liquid-gas separator 224. The steam generator 226 may be fueled with a portion of the recovered oil in tank 228. Water is preheated in jacket 230 and the generated steam can again be fed into recycle line 232.

Auxiliary heat in this embodiment may be provided by directly injecting air or oxygen through line 234 into the lower portion of the heat exchanger 204. An excess of oxygen is utilized to prevent soot formation and blocking of the windows 240 of the heat exchanger 204. The oxygen may be preheated in jacket 242.

The reactor can be loaded with finely divided oil shale having a diameter about 100 microns and the recycle gas is heated to a temperature of 800° F. to 1000° F. The kerogen releases from the shale and is pyrolyzed and cracked to molecules within the fuel oil range.

It is to be realized that only preferred embodiments of the invention have been described and that numerous substitutions, modifications and alterations are permissible without departing from the spirit and scope of the invention as defined in the following claims.

I claim:

1. A method of pyrolyzing shale comprising the steps of:
    passing a recycle gas stream through a gas-permeable, high-heat capacity solar-heated heat exchange element to form a heated carrier gas, at a temperature of at least 350° C.;
    passing the carrier gas downwardly through a pipe positioned within a bed of shale;
    flowing the gas upwardly through a bed of shale to pyrolyze the shale without combustion of the shale and evolve gaseous and liquid hydrocarbons therefrom into the carrier gas to form pyrolysis gas;
    removing the pyrolysis gas from the bed;
    separating liquid product from the pyrolysis gas to form liquid product and gas product; and
    dividing a portion of the gas product into a recycle gas stream and recovering the remainder.

2. A method according to claim 1 further including the step of injecting steam into the recycle gas stream.

3. A method according to claim 1 further including the step of combusting a portion of the recycle gas stream.

4. A method according to claim 3 in which the portion is combusted after passage of the recycle gas stream through the heating exchange element.

5. A method according to claim 4 in which the recycle gas stream is combusted by injection of an oxidizing gas into the stream.

6. A method according to claim 1 in which the recycle gas stream is composed of 10 to 40 percent by volume of the gas product.

7. A method according to claim 6 in which the recycle gas is heated to a temperature from 400° C. to 700° C.

8. A method according to claim 7 in which the bed of shale is a fixed bed and the shale particles have a diameter from 0.1 to 3 inches.

9. A method according to claim 7 in which the bed is fluidized by means of the upwardly flowing recycle gas and the shale particles have a diameter from 1 to 1000 microns.

10. A method according to claim 1 further including the steps of separating solids from the pyrolysis gas.

11. A method according to claim 10 further including the step of separating spent oil shale solids from the bed.

12. A method according to claim 1 in which the heat exchange element includes a high heat capacity ceramic honeycomb receiver.

13. A method according to claim 5 in which the oxidizing gas is air and further includes the step of preheating the air by means of heat from the bed and the element.

14. A method according to claim 2 in which the steam is generated by means of heat from the bed and the element.

* * * * *